(No Model.)
J. CLARK.
WAGON JACK.
No. 255,490. Patented Mar. 28, 1882.
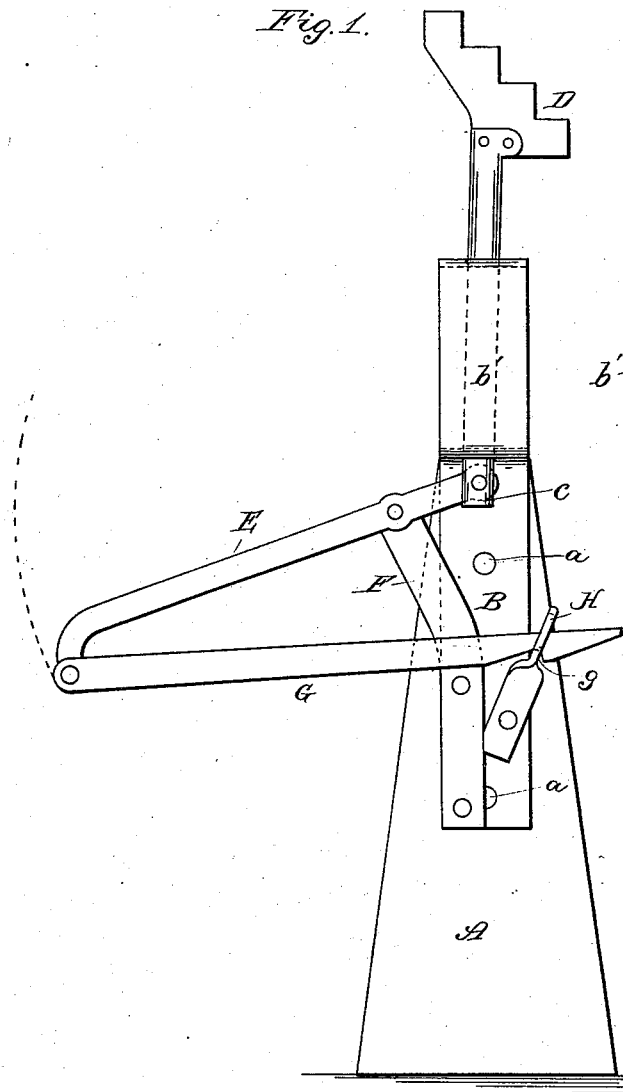
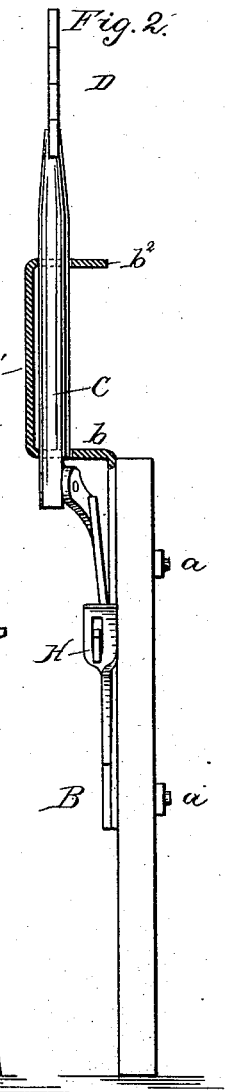
Witnesses:
J. B. Garner
F. O. McCleary
Inventor:
James Clark,
By Robt. J. Murray
Attorney

UNITED STATES PATENT OFFICE.

JAMES CLARK, OF CLEBURNE, TEXAS.

WAGON-JACK.

SPECIFICATION forming part of Letters Patent No. 255,490, dated March 28, 1882.

Application filed December 21, 1881. (No model.)

*To all whom it may concern:*

Be it known that I, JAMES CLARK, a citizen of the United States, residing at Cleburne, in the county of Johnson and State of Texas, have invented certain new and useful Improvements in Wagon-Jacks, of which the following is a specification, reference being had therein to the accompanying drawings.

My invention relates to wagon-jacks, the object being to provide a jack of simple and economical construction which will be applicable alike to light and heavy vehicles.

The invention consists in the improved construction hereinafter described, and pointed out in the claims.

In the drawings, Figure 1 is a front elevation of my improved wagon-jack, and Fig. 2 is a vertical section of the same.

A represents a standard or support, preferably of wood, and of tapering form, as shown. To this standard is secured by rivets or bolts $a$ a metallic strip, B. The latter lies flat against the side of the standard A, to the upper end of the latter, where it is bent outward at a right angle to the standard to form a guide, $b$, for the shank of the jack, and then upward to form the brace $b'$, and then inward to form the upper guide, $b^2$, for the shank of the jack. The guides $b$ and $b^2$ are perforated, as shown.

C represents the shank or standard of the stepped plate D. This plate is secured to the upper end of the shank, which latter passes through the guides $b$ $b^2$, and is pivoted at its lower end to a lever, E, which is fulcrumed on an arm, F, projecting from the strip B, or secured thereto or to the standard A. The outer end of the lever E is pivoted to a rod, G, which extends inwardly, and is provided with one or more notches, $g$, adapted to engage with a catch, H, projecting from the inner side of the strip B, or secured to said strip or to the standard A. The catch H is formed of a short strip of metal secured to the strip B, and twisted so that its upper end will extend at a right angle to the lower end, and be provided with a perforation to receive the inner end of the rod G.

The operation of my device is readily understood. The stepped plate D being placed beneath the axle of a vehicle, the lever E is drawn down, thus forcing the plate D up, and the catch-rod G, engaging with the catch H, secures the device in locked position. It is readily unlocked by turning the catch rod and lever up.

It will be apparent that many slight changes in the details of construction may be resorted to without departing from the spirit of my invention.

It will also be apparent that I may construct the jack of wood or metal, or both, as desired.

Having fully described my invention, what I claim as new, and desire to secure by Letters Patent, is—

1. In a wagon-jack, the combination, with a standard, of a metallic strip bent to form horizontal guides, the latter being perforated, as described, a stepped plate and shank passing through said guides, and a lever pivoted to the lower end of said shank and provided with a suitable catch device for locking it in position, substantially as described.

2. In a wagon-jack, the combination, with a standard, of a strip, B, bent to form guides $b$ $b^2$, the plate D, and shank C, the lever E, fulcrumed on the arm F, and catch H, substantially as described.

In testimony whereof I affix my signature in presence of two witnesses.

JAMES CLARK.

Witnesses:
B. F. EDWARDS,
S. C. PADELFORD.